US009145306B2

(12) United States Patent
Kim et al.

(10) Patent No.: US 9,145,306 B2
(45) Date of Patent: Sep. 29, 2015

(54) METHOD FOR PREPARING METAL COMPOUND NANOPARTICLES

(75) Inventors: Sang Woo Kim, Seoul (KR); Kwang Deok Kim, Changwon-si (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 693 days.

(21) Appl. No.: 12/578,191

(22) Filed: Oct. 13, 2009

(65) Prior Publication Data

US 2010/0178227 A1 Jul. 15, 2010

(30) Foreign Application Priority Data

Jan. 9, 2009 (KR) ........................ 10-2009-0001980

(51) Int. Cl.
| | | |
|---|---|---|
| *C01F 17/00* | (2006.01) | |
| *B82Y 30/00* | (2011.01) | |
| *C01B 13/32* | (2006.01) | |
| *C01B 13/36* | (2006.01) | |
| *C01F 5/08* | (2006.01) | |
| *C01F 5/20* | (2006.01) | |
| *C01F 5/24* | (2006.01) | |

(52) U.S. Cl.
CPC ............. *C01F 17/0043* (2013.01); *B82Y 30/00* (2013.01); *C01B 13/32* (2013.01); *C01B 13/36* (2013.01); *C01F 5/08* (2013.01); *C01F 5/20* (2013.01); *C01F 5/24* (2013.01); *C01P 2002/01* (2013.01); *C01P 2002/72* (2013.01); *C01P 2004/03* (2013.01); *C01P 2004/04* (2013.01); *C01P 2004/16* (2013.01); *C01P 2004/24* (2013.01); *C01P 2004/32* (2013.01); *C01P 2004/38* (2013.01); *C01P 2004/42* (2013.01); *C01P 2004/64* (2013.01); *C01P 2006/12* (2013.01)

(58) Field of Classification Search
USPC .............. 423/263, 430, 636, 592.1, 605, 606, 423/624, 635, 594.18; 502/300, 302, 305, 502/324, 340, 349, 355
See application file for complete search history.

(56) References Cited

U.S. PATENT DOCUMENTS

| | | | |
|---|---|---|---|
| 6,387,341 B1 | 5/2002 | Sarrade et al. | |
| 6,686,310 B1 * | 2/2004 | Kourtakis et al. ............. | 502/325 |
| 2006/0269463 A1 * | 11/2006 | Lee et al. ...................... | 423/263 |

FOREIGN PATENT DOCUMENTS

| | | | |
|---|---|---|---|
| EP | 1199280 A1 | | 4/2002 |
| JP | 2006265005 A | * | 10/2006 |
| WO | 2004/050251 A1 | | 6/2004 |
| WO | 1572368 A1 | | 9/2005 |
| WO | 2007/029932 A1 | | 3/2007 |

OTHER PUBLICATIONS

Schehl et al, Alumina nanocomposites from powder-alkoxide mixtures, 2002, Acta Materialia, 50, 1125-1139.*

(Continued)

*Primary Examiner* — Kaj K Olsen
*Assistant Examiner* — Pritesh Darji
(74) *Attorney, Agent, or Firm* — Ladas & Parry LLP

(57) ABSTRACT

A method for preparing metal compound nanoparticles, comprising treating a uniform dispersion of at least one metal precursor in an organic solvent with a supercritical carbon dioxide fluid to attain a homogeneous mixture, which is subjected to a solvothermal reaction under a supercritical $CO_2$ condition, makes it easy to prepare nanoparticles of a metal oxide, a doped metal compound, or a metal complex having various shapes.

15 Claims, 6 Drawing Sheets

(56) References Cited

OTHER PUBLICATIONS

Sui at al, Direct synthesis of zirconia aerogel nanoarchitecture in supercritical CO2, 2006, Langmuir, 22, 4390-4396.*

Ruohong Sui, Synthesis and Characterization of Oxide Nanostructures via a sol-gel route in Supercritical Co2, 2007, p. 1-231.*

Sui et al., FTIR Study on the Formation of TiO2 Nanostructures in Supercritical CO2, 2006, J. Phys. Chem., 110, 16212-16218.*

Boddu et al., Synthesis and Characterization of Coralline Magnesium Oxide Nanoparticles, 2008, J. Am. Ceram. Soc., 91, 1718-1720.*

European Search Report; dated Sep. 26, 2012 Application No. 09172956.6.

* cited by examiner

METHOD FOR PREPARING METAL COMPOUND NANOPARTICLES

FIELD OF THE INVENTION

The present invention relates to a method for preparing metal compound nanoparticles having various shapes, and more particularly, to a method for preparing metal compound nanoparticles of a metal oxide, a doped metal compound, a metal complex or others, having a spherical, fibrous or sheet shape, by subjecting an organic solution containing a metal precursor to a solvothermal reaction in supercritical carbon dioxide.

BACKGROUND OF THE INVENTION

Nanoparticles of a metal compound, e.g., a metal oxide, a doped metal compound, and a metal complex, are widely used in the fields of chemical catalysts, optoelectronic materials, optical materials, sensor materials, flame retardant materials, electrode materials and others. Such nanoparticles are provided in various shapes which include, e.g., spherical particles, nanofibers, and nanosheets having enhanced surface activity.

A method of preparing such nanoparticles comprises placing a metal salt solution in an autoclave, heating to a predetermined reaction temperature, and performing hydrothermal synthesis or solvothermal synthesis. However, this method produces coarse metal compound particles having a large particle size and a low specific surface area.

There have recently been developed various methods of preparing such nanoparticles, examples of which include a sol-gel method (US Patent Publication No. 2007/0092423A1), a co-precipitation method (US Patent Publication No. 2006/0150526A1), a hydrothermal synthesis method (US Patent Publication No. 2005/0003744A1), and a spray pyrolysis method (Korean Unexamined Patent Publication No. 2004-0069404).

US Patent Publication No. 2007/0092423A1 discloses a method of preparing spherical or fibrous oxide nanoparticles by conducting a hydrolytic or non-hydrolytic sol-gel reaction, which comprises heating a mixture of a metal precursor and a surfactant in an organic solvent to produce a metal-surfactant complex, which is then combined with an ester and heated, to obtain nanoparticles. However, this method is problematic in that the use of expensive materials is required, the process is complicated, and the formation of the metal-surfactant complex is sluggish.

US Patent Publication No. 2006/0150526A1 discloses a method of producing oxide particles via precipitating a metal ammonium carbonate salt, which is then heat-treated. This patent discloses the production of particles having a very high specific surface area. However, the particles thus formed are of the form of a large aggregate, and it is difficult to obtain particles having good dispersibility and a uniform particle size.

US Patent Publication No. 2005/0003744A1 discloses a method of preparing composite particles by treating a cerium-titanium-mixed precursor with potassium hydroxide, and subjecting the reaction mixture to hydrothermal synthesis at a high temperature of about 300° C. over a long period of time. Although this method is useful for doping a titanium oxide with cerium oxide, it is disadvantageous because the synthesis requiring a long period of reaction under a high temperature and high pressure condition, leading to increased energy cost and generation of impurities.

Korean Unexamined Patent Publication No. 2004-0069404 discloses a spray pyrolysis method, which comprises spraying a metal precursor through a nozzle, to obtain spherical granules which are subsequently heat-treated, to obtain an oxide. This method is advantageous because the process is simple and chemically uniform oxide particles may be obtained, but suffers from the problem that the particle size is non-uniform and a large aggregate is formed.

In addition, there is reported a supercritical hydrothermal reaction method for preparing metal oxide particles by treating an aqueous metal salt solution with aqueous alkali under a supercritical condition of water. This method may be performed using a continuous process, but the synthesis performed under a high-temperature and high-pressure condition of 380° C. and 500 bar or more, requires the use of expensive equipments and a high process energy cost.

As mentioned above, the conventional techniques each has problems, and thus, there is a need for an improved, economical method of preparing metal compound nanoparticles having a desired shape.

SUMMARY OF THE INVENTION

Accordingly, it is an object of the present invention to provide an improved method of preparing metal compound nanoparticles with various shapes through a solvothermal reaction at relatively low temperatures and pressures, solving the problems of the prior arts.

In accordance with an aspect of the present invention, there is provided a method for preparing metal compound nanoparticles, comprising: (1) treating a uniform dispersion of at least one metal precursor in an organic solvent with a supercritical carbon dioxide fluid with stirring, to obtain a homogeneous fluid mixture; (2) maintaining the fluid mixture for 1 min to 100 hours at a subcritical condition of 30 to 300° C. and 0.5 to 30 MPa, to allow a solvothermal reaction to proceed; and (3) cooling the reaction mixture, followed by performing supercritical drying, to isolate the metal compound nanoparticles.

According to the inventive method, nanoparticles of a metal oxide, a doped metal compound or a metal complex can be prepared without or with small amount of additional components necessary to promote reaction within a short time at relatively low temperatures and pressures. Further, the type and shape of the metal compound nanoparticles can be easily controlled by varying the reaction conditions. The resulting nanoparticles have high crystallinity, high specific surface area, and chemical uniformity.

BRIEF DESCRIPTION OF THE DRAWINGS

The above and other objects and features of the present invention will become apparent from the following description of the invention, when taken in conjunction with the accompanying drawings, which show.

DETAILED DESCRIPTION OF THE INVENTION

Figure 1:
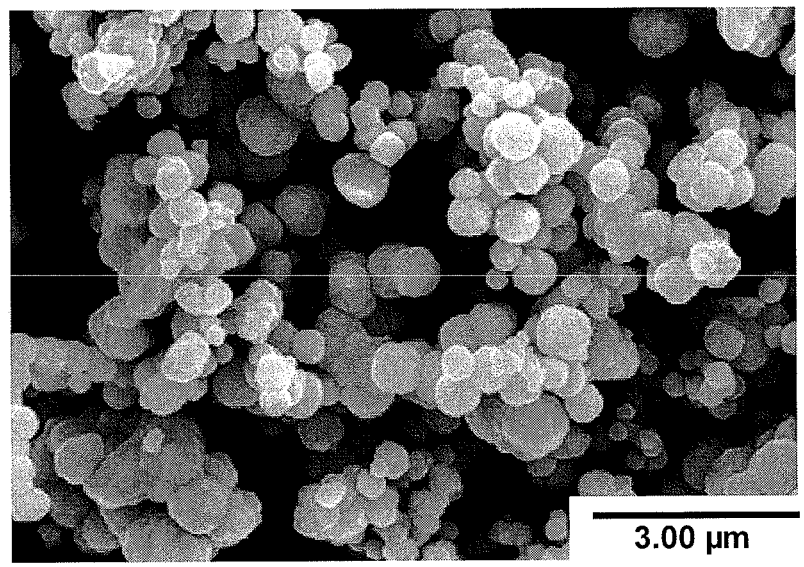
FIG. 1: a scanning electron microscope (SEM) image of the spherical cerium oxide nanoparticles obtained in Example 1-28.

In step (1) of the method of the present invention, a uniform dispersion of at least one metal precursor in an organic solvent is treated with a supercritical carbon dioxide fluid with stirring, to obtain a homogeneous fluid mixture.

Wherein, the organic solvent may include at least one $C_1$-$C_{10}$ alcohol, preferably methanol or ethanol.

Optionally, a secondary or tertiary alcohol as a co-solvent may be added to the organic solvent in an amount of 0.01 to 10 mol based on 1 mol of the metal precursor. The adding the co-solvent may help to control the concentration of the metal compound and the size or shape of the particles, and to increase the yield of metal compounds and the amount of a doped metal compound.

The metal precursor used in the present invention is not particularly limited. For example, the metal precursor may comprise at least one chemical substance selected from the group consisting of a metal fluoride; a metal hydroxide; a metal alkoxide; a metal hydride; a metal complex; an inorganic acid metal salt such as a metal nitrate, a metal chloride, a metal sulfate and a metal carbonate; and an organic acid metal salt such as a metal acetate. Preferably, the metal precursor may be a metal nitrate, a metal organic acid salt or a metal chloride.

The metal component of the metal precursor is not particularly limited. For example, the metal component may include one or more components selected from the group consisting of Ru, Rh, Cu, Ag, Au, Pd, Pt, Sb, Sc, Sr, V, Cu, Y, Ce, Mo, W, Fe, Zr, Co, Ni, Zn, Cd, Mn, Ca, Ba, Cs, Cr, Mg, Ti, Al, In, Sn, Se, Fe, Cd, Te, Ga, Gd, Ge, Dy, Pr, Sm, Ho, Lu, Tb, Eu, Nd, La, Ta, Hf, Er, and Yb.

The concentration of the metal precursor dispersed in the organic solvent in step (1) is not particularly limited, but is preferably 0.01 to 5 mol/L, and more preferably 0.05 to 1 mol/L. When the concentration is in the above range, the process can be more cost-effective, smaller particles may be produced, and the yield may be further increased.

The metal precursor used in step (1) may be a mixture of two or more metal precursors to obtain metal compound nanoparticles in the form of a doped metal compound, e.g., a substitutional or interstitial solid solution, or a metal complex. The combination of the metal precursors may be selected corresponding to the use of the resulting metal compound nanoparticles. The mixing ratio of the metal precursors may be adjusted corresponding to the stoichiometric ratio for synthesis of the metal compound nanoparticles.

The supercritical carbon dioxide fluid used in the present invention may be prepared by maintaining carbon dioxide at a temperature ranging from 30 to 100° C. under a pressure ranging from 0.5 to 30 MPa.

According to an example of the present invention, step (1) may be performed by dispersing at least one metal precursor in the organic solvent, adding an acid or an alkali to the dispersion, and mixing the dispersion with the supercritical carbon dioxide fluid at 30 to 100° C. under 0.5 to 15 MPa for 1 min to 10 hours, to obtain the homogeneous fluid mixture.

In step (2) of the method of the present invention, the fluid mixture obtained in step (1) is kept for 1 min to 100 hours at a subcritical condition of 30 to 300° C. under 0.5 to 30 MPa, to allow a solvothermal reaction to proceed.

Preferably, the solvothermal reaction in step (2) may be conducted at a temperature of 100 to 200° C. under a pressure of 2 to 20 MPa for 1 min to 20 hours. These conditions may lead to acceleration of the reaction, uniform particles, increased crystallinity, reduced process cost.

Before or during the reaction in step (2), an additional component may be added to the reaction mixture in an amount of 0.01 to 10 mol based on 1 mol of the metal precursor. Examples of the additional component are an alkaline solution such as ammonia, an acidic solution such as sulfuric acid, a reducing agent such as hydrogen, an oxidizing agent such as oxygen or hydrogen peroxide, an organic solvent including an aromatic hydrocarbon, and distilled water. Herein, the organic solvent such as toluene may act as an antisolvent for controlling the shape of the resulting nanoparticles. Moreover, the shape, amount and properties of the resulting metal compound nanoparticles can be controlled by varying the species and amount of the additional component.

Moreover, before or during the reaction in step (2), a reactive or carrier gas such as ammonia, nitrogen, methane, helium or argon may be added to the reaction mixture for accelerating or retarding the reaction with the metal precursor, so as to control the size and shape of the resulting nanoparticles.

In step (3) of the method of the present invention, the reaction mixture obtained in step (2) is cooled followed by performing supercritical drying to isolate the metal compound nanoparticles.

Preferably, the supercritical drying may be performed at 30 to 100° C. under 3 to 20 MPa.

The metal compound nanoparticles obtained in the present invention may be provided in the shape of a sphere, a fiber, a sheet, a wire, a bundle, a cube, or a pyramid.

The inventive method enables to prepare nanoparticles having very high crystallinity, and thus requires no subsequent heat-treatment of the nanoparticles. However, in order to further increase the crystallinity or to obtain various shapes of the nanoparticles, heat-treatment may be additionally performed under vacuum, normal pressure, or high pressure in a reaction furnace or a microwave synthesis furnace.

The inventive metal compound nanoparticles may be further processed for various uses. For example, the metal compound nanoparticles obtained by the inventive method may be further processed into the form of granules, balls, discs, cylinders, honeycombs, sheets or composite films, or may be applied on a ceramic, a metal, a polymer film, a substrate, or a support, to be used as a catalyst for fuel processing or a fuel cell, a desulfurization material, or an electrode for a fuel cell.

In comparison with conventional sol-gel methods, the inventive method can produce of nanofibers or nanowires even without the use of an expensive surfactant and precursor. Also, the inventive method can synthesize nanoparticles having high crystallinity even without heat-treatment, whereas conventional co-precipitation methods synthesize oxide particles using heat-treatment of ammonium carbonate. Also, while conventional methods use a hydrothermal or supercritical hydrothermal synthesis device under extreme conditions of high temperature and high pressure, the inventive method uses carbon dioxide which is environmentally friendly, so as to produce metal compound nanoparticles having high crystallinity, a high specific surface area and chemical uniformity within a short time even under relatively mild conditions.

The inventive method can easily control the particle size in the range from 1 to 990 nm, and enables the preparation of the nanoparticles having various shapes including spherical, cubic, fibrous and wire shape. Thus, the metal compound nanoparticles prepared in the present invention can be used alone as a chemically active material for a catalyst, an inorganic flame retardant material, a catalyst material for a fuel cell, a material for a solar cell and so on, or can be combined with another compound to be used for a preparation of a catalyst material for a fuel additive, an electrode material for a fuel cell, an oxidation catalyst for hydrocarbon fuel such as methane or propane, or inorganic particles for a dye-sensitized solar cell.

The following Examples are intended to further illustrate the present invention without limiting its scope.

EXAMPLE 1

Preparation of Cerium Oxide Nanoparticles

Cerium oxide nanoparticles having various shapes were prepared using the inventive method, as follows.

EXAMPLE 1-1

Cerium nitrate hexahydrate was added to ethanol to a concentration of 0.10 mol/L, stirred and dispersed, to obtain a metal salt solution, which was placed in a supercritical $CO_2$ reactor and heated to 50° C., while carbon dioxide was injected into the reactor using a tube having ¼ inch inner diameter to a pressure of 7.5 MPa to obtain a fluid mixture composed of the metal salt solution and compressed carbon dioxide. Then, the fluid mixture was heated to a temperature of 120° C. and a pressure of 18 MPa, to attain a supercritical $CO_2$ state. The resulting fluid was kept for 10 hours, cooled, and supercritical drying was performed to remove carbon dioxide and the solvent, to obtain cerium oxide nanoparticles.

EXAMPLES 1-2 to 1-37

Various cerium oxide nanoparticles were prepared using a procedure similar to that of Example 1-1, except for changing the concentration of the metal salt solution and the reaction conditions according to Table 2.

The shapes of the metal oxide nanoparticles obtained in Examples 1-1 to 1-37 were observed with an electron microscope. The results are summarized in Table 1.

TABLE 1

| Example No. | Metal salt solution (mol/L) | Temp. (° C.) | Pressure (MPa) | Time (h) | Particle shape |
|---|---|---|---|---|---|
| 1-1 | 0.10 | 120 | 18 | 10 | fiber, sphere |
| 1-2 | 0.10 | 120 | 29 | 20 | sphere |
| 1-3 | 0.10 | 125 | 17 | 1 | sphere(aggregates) |
| 1-4 | 0.10 | 125 | 17 | 2 | fiber, sphere |
| 1-5 | 0.21 | 125 | 16 | 1 | sphere |
| 1-6 | 0.21 | 125 | 15 | 2 | sphere |
| 1-7 | 0.21 | 130 | 21 | 2 | fiber, sphere |
| 1-8 | 0.21 | 130 | 18 | 2 | fiber |
| 1-9 | 0.32 | 130 | 18 | 2 | sphere, bundle |
| 1-10 | 0.43 | 130 | 15 | 2 | sphere(aggregates) |
| 1-11 | 0.10 | 135 | 20 | 0.25 | sphere |
| 1-12 | 0.10 | 135 | 16 | 1 | fiber, sphere |
| 1-13 | 0.43 | 135 | 16 | 2 | fiber, sphere |
| 1-14 | 0.10 | 140 | 21 | 1/12 | fiber, sphere |
| 1-15 | 0.10 | 140 | 17 | 0.25 | bundle |
| 1-16 | 0.10 | 140 | 19 | 10 | fiber, sphere |
| 1-17 | 0.10 | 140 | 20 | 20 | sphere |
| 1-18 | 0.10 | 145 | 18 | 1/60 | wire |
| 1-19 | 0.10 | 150 | 24 | 0.5 | fiber, sphere |
| 1-20 | 0.10 | 150 | 22 | 1 | fiber, sphere |
| 1-21 | 0.10 | 150 | 21 | 2 | fiber, sphere |
| 1-22 | 0.10 | 160 | 21 | 1/60 | fiber, sphere |
| 1-23 | 0.10 | 125 | 18 | 1.5 | fiber |
| 1-24 | 0.21 | 125 | 17 | 1.5 | fiber |
| 1-25 | 0.32 | 125 | 19 | 1.5 | fiber |
| 1-26 | 0.43 | 125 | 22 | 1.5 | bundle |
| 1-27 | 0.10 | 130 | 20 | 1/12 | sphere |
| 1-28 | 0.10 | 130 | 20 | 1 | sphere |
| 1-29 | 0.10 | 130 | 21 | 2 | fiber |
| 1-30 | 0.10 | 130 | 16 | 2.5 | fiber, sphere |
| 1-31 | 0.10 | 130 | 17 | 3 | sphere |
| 1-32 | 0.10 | 130 | 17 | 10 | sphere |
| 1-33 | 0.10 | 130 | 17 | 20 | sphere |
| 1-34 | 0.10 | 135 | 9 | 0.25 | fiber, sphere |
| 1-35 | 0.10 | 135 | 17 | 0.5 | fiber, sphere |
| 1-36 | 0.10 | 135 | 16 | 1 | sphere, bundle |
| 1-37 | 0.10 | 135 | 18.5 | 2 | sphere |

It can be seen from Table 1 that, in the examples of the present invention, the metal oxide nanoparticles having various shapes were prepared by changing the reaction conditions, i.e., by varying the concentration of the metal salt, the reaction temperature, the reaction pressure and the reaction time in an appropriate manner.

Figure 2:
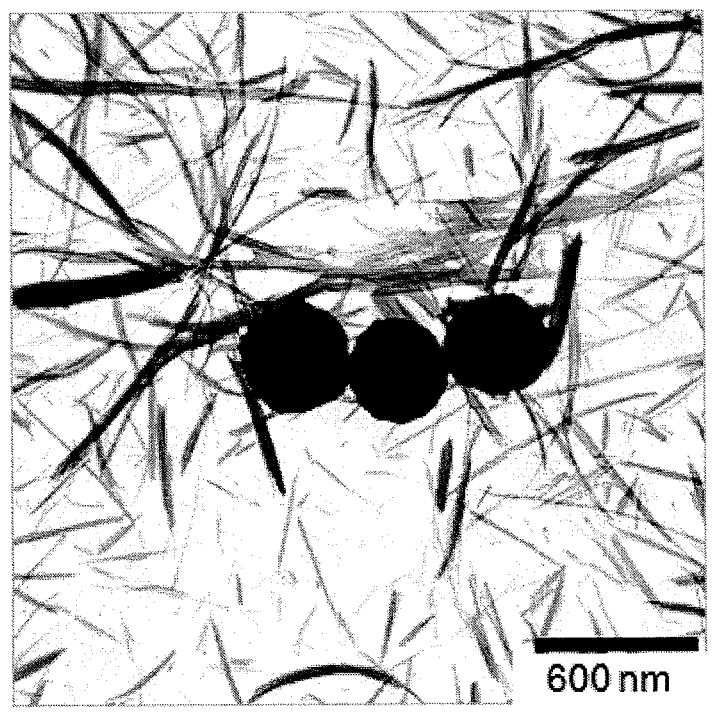
FIG. 2: an SEM image of the spherical and fibrous cerium oxide nanoparticles obtained in Example 1-35.
Figure 3:
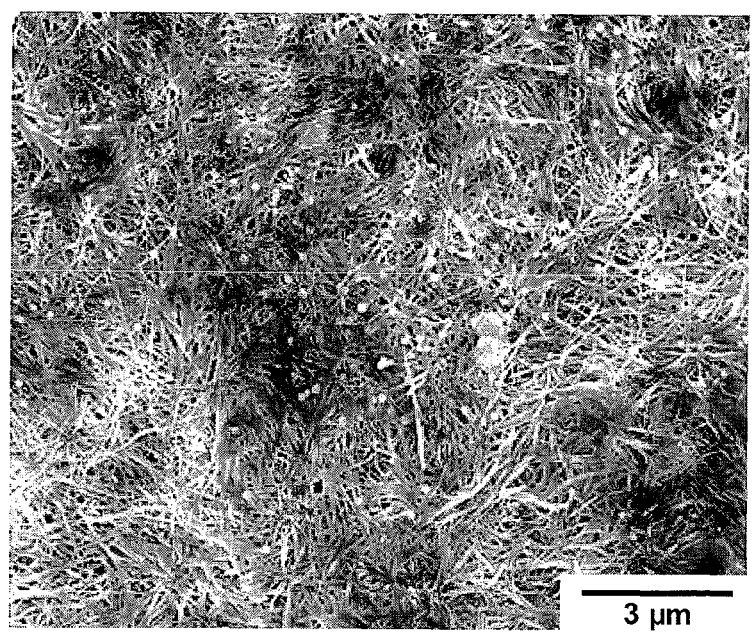
FIG. 3: an SEM image of the wire-shaped cerium oxide nanoparticles obtained in Example 1-18.

FIGS. 1 to 3 are SEM images of the nanoparticles of Examples 1-28, 1-35 and 1-18, respectively. It can be seen from FIGS. 1 to 3 that the inventive method can be used to prepare cerium oxide nanoparticles having various shapes.

Figure 4:
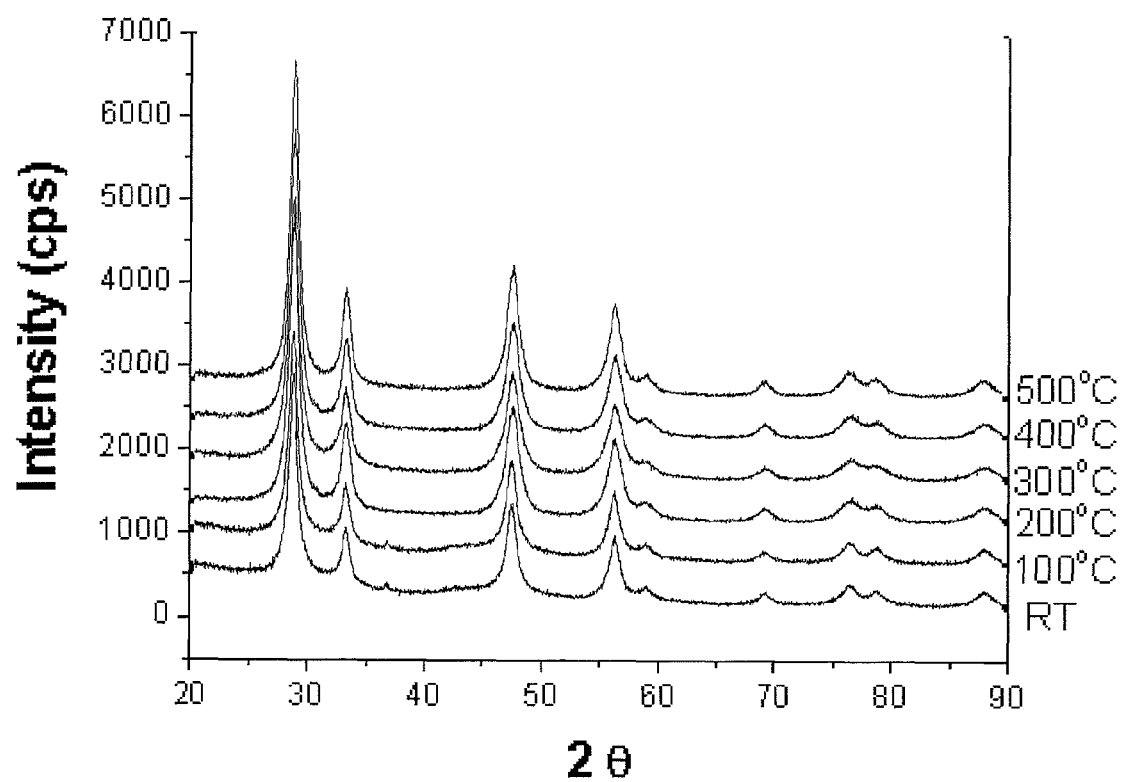
FIG. 4: high-temperature X-ray diffraction patterns of the cerium oxide nanoparticles obtained in Example 1-11.

FIG. 4 shows the high-temperature XRD patterns of the nanoparticles obtained by heat-treating the metal oxide nanoparticles of Examples 1-11 at 100 to 500° C. It can be seen from FIG. 4 that crystallinity of the metal oxide nanoparticles did not change with the heat-treatment temperature. Thus, the inventive method can be used to prepare such nanoparticles having high crystallinity without conducting a heat-treatment step.

Figure 5:
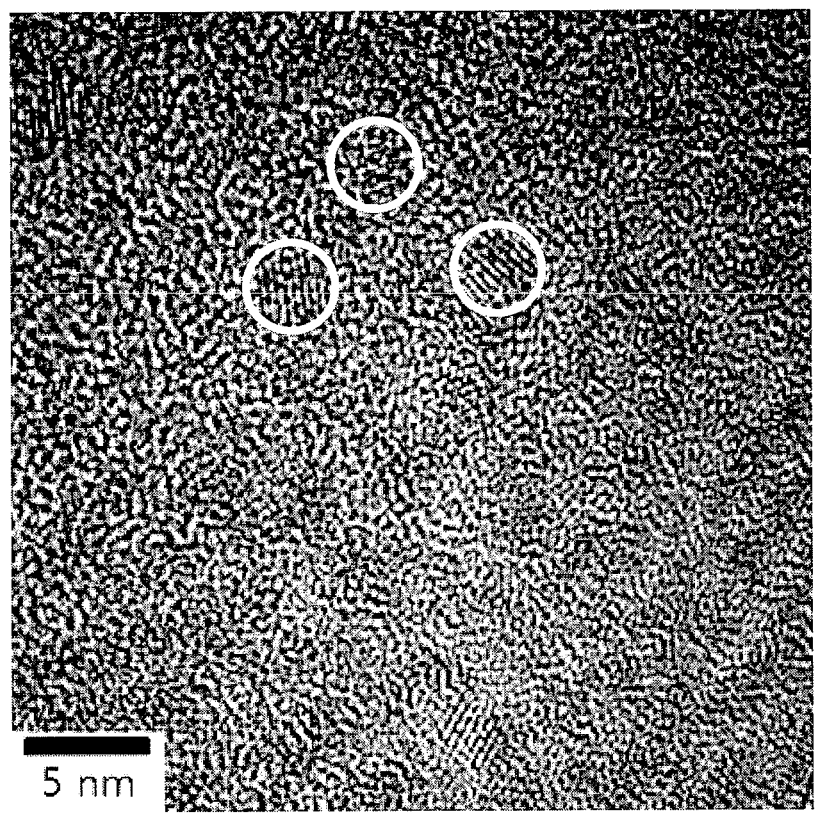
FIG. 5: a high-resolution transmission electron microscope (TEM) image of the cerium oxide nanoparticles with high crystallinity obtained in Example 1-27.

FIG. 5 shows a high-resolution TEM image of the metal oxide nanoparticles obtained in Examples 1-27. It can be seen from FIG. 5 that the resulting spherical cerium oxide particles have a very high degree of crystallinity and a particle size of 3 to 4 nm.

EXAMPLE 2

Preparation of Doped Metal Compound Nanoparticles

EXAMPLE 2-1

Cerium nitrate and gadolinium nitrate were mixed in a molar ratio of 4:1. This metal salt mixture was added to an ethanol-isopropyl alcohol cosolvent (9:1, v/v) and 0.05 N nitric acid to a concentration of 0.61 mol/L, stirred and dispersed to obtain a mixed metal salt solution, which was placed in a supercritical $CO_2$ reactor and heated to 35° C., while carbon dioxide was injected into the reactor using a tube having ¼ inch inner diameter to a pressure of 5 MPa, to obtain a fluid mixture composed of the metal salt solution and compressed carbon dioxide. Then, the fluid mixture was heated to a temperature of 125° C. and a pressure of 15 MPa, to attain a supercritical $CO_2$ state. The resulting fluid was kept for 1.5 hours, cooled, and supercritical drying was performed to remove carbon dioxide and the solvent, to obtain nanoparticles of gadolinium-doped cerium oxide and cerium-gadolinium complex.

EXAMPLES 2-2 to 2-14

Various doped metal compound nanoparticles in the form of a substitutional or interstitial solid solution and a metal complex were prepared using a procedure similar to that of Example 2-1, except for changing the concentration of the metal salt solution, the additional metal salt, the added amounts and the reaction conditions, according to Table 2.

The shapes of metal compound nanoparticles obtained in Examples 2-1 to 2-14 were photographed with a TEM and an SEM. The results are summarized in Table 2.

TABLE 2

| Example No. | Metal salt solution (mol/L) | Additional metal salt | Ratio[1] | Reaction conditions Temp. (° C.) | Pressure (MPa) | Time (h) | Particle shape |
|---|---|---|---|---|---|---|---|
| 2-1 | 0.61 | $Gd(NO_3)_3$ | 4:1 | 125 | 15 | 1.5 | sphere |
| 2-2 | 0.15 | $Gd(NO_3)_3$ | 4:1 | 125 | 15 | 2 | fiber |
| 2-3 | 0.15 | $Gd(NO_3)_3$ | 4:1 | 125 | 16 | 2.5 | bundle, sphere |
| 2-4 | 0.15 | $Gd(NO_3)_3$ | 4:1 | 130 | 20 | 1 | fiber, sphere |
| 2-5 | 0.15 | $Gd(NO_3)_3$ | 4:1 | 130 | 26 | 2 | fiber, sheet |
| 2-6 | 0.31 | $Gd(NO_3)_3$ | 4:1 | 130 | 15 | 2 | fiber, sheet, sphere |
| 2-7 | 0.25 | $Gd(NO_3)_3$ | 4:1 | 130 | 20 | 2 | fiber, sphere |
| 2-8 | 0.38 | $Gd(NO_3)_3$ | 9:1 | 130 | 15 | 2 | sphere |
| 2-9 | 0.15 | $Gd(NO_3)_3$ | 4:1 | 135 | 15 | 2 | fiber |
| 2-10 | 0.15 | $Gd(NO_3)_3$ | 9:1 | 135 | 15 | 2 | fiber |
| 2-11 | 0.15 | $Y(NO_3)_3$ | 9:1 | 135 | 15 | 2 | fiber, sphere |
| 2-12 | 0.15 | $Cu(NO_3)_2$ | 9:1 | 135 | 15 | 2 | fiber, sphere |
| 2-13 | 0.15 | $La(NO_3)_3$ | 9:1 | 135 | 15 | 2 | fiber, sphere |
| 2-14 | 0.15 | $PdCl_2$ | 9:1 | 135 | 15 | 2 | sphere |

[1]mixing ratio by mole (cerium nitrate:additional metal salt)

It can be seen from Table 2 that the methods according to Examples 2-1 to 2-14 could produce cerium oxide nanoparticles doped with Gd, Y, La, Cu or Pd having various shapes of a sphere, a fiber and a sheet.

Figure 6:
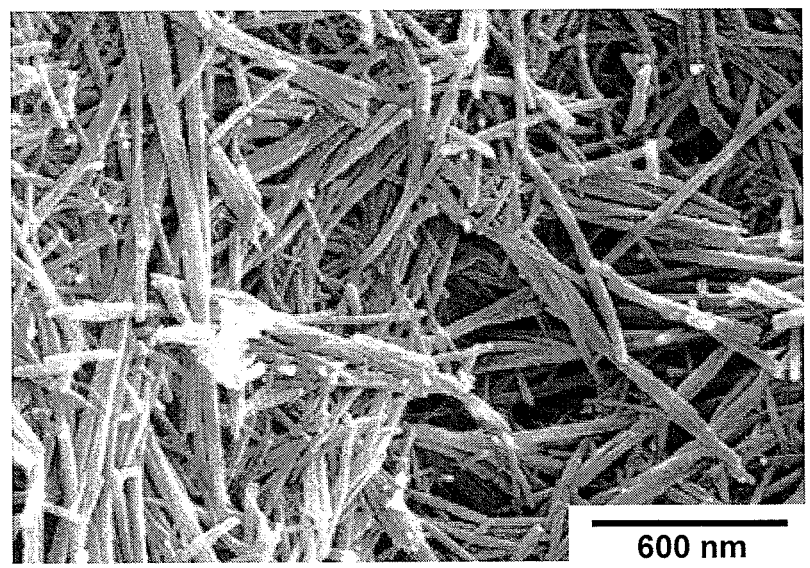
FIG. 6: an SEM image of the fibrous gadolinium-doped cerium oxide nanoparticles obtained in Example 2-9.

FIG. 6 shows an SEM image of Gd-doped cerium oxide nanoparticles obtained in Example 2-9. It can be seen from FIG. 6 that the method according to Example 2-9 produced Gd-doped cerium oxide nanoparticles having fibrous shape.

EXAMPLE 3

Preparation of Magnesium Compound Nanoparticles

EXAMPLE 3-1

Magnesium chloride was added to ethanol to a concentration of 0.2 mol/L, stirred and dispersed to obtain a metal salt solution, which was placed in a reactor and adjusted to pH 9 using ammonia water to obtain a metal precursor solution comprising magnesium hydroxide precursor. Then, the metal precursor solution was mixed with a supercritical carbon dioxide fluid to obtain a fluid mixture. The fluid mixture was subjected to a solvothermal reaction at 50° C. under 0.5 MPa for 30 min, cooled, and supercritical drying was performed to remove carbon dioxide and the solvent, to obtain magnesium hydroxide nanoparticles.

EXAMPLES 3-2 to 3-6

Various magnesium hydroxide nanoparticles were prepared using a procedure similar to that of Example 3-1, except for changing the reaction conditions according to Table 3.

EXAMPLE 3-7

Magnesium chloride was added to ethanol to a concentration of 0.2 mol/L, stirred and dispersed to obtain a metal salt solution, which was placed in a reactor and adjusted to pH 9 using ammonia water to obtain a metal precursor solution comprising a magnesium hydroxide precursor. Then, carbon dioxide began to be injected into the reactor. As first reaction, the fluid mixture was allowed to react at 35° C. under 7.5 MPa for 1 hour with stirring. As second reaction, a solvothermal reaction was performed at 120° C. under 17 MPa for 30 min. Then, the resulting fluid mixture was cooled and supercritically dried to remove carbon dioxide and the solvent, to obtain magnesium hydroxide nanoparticles.

EXAMPLES 3-8 to 3-14

Various magnesium compound nanoparticles were prepared using a procedure similar to that of Example 3-7, except for changing the reaction conditions according to Table 3.

EXAMPLE 3-15

Magnesium nitrate was added to ethanol to a concentration of 0.5 mol/L, stirred and dispersed to obtain a metal salt solution, which was placed in a reactor. Then, carbon dioxide began to be injected into the reactor. As first reaction, the reaction solution was allowed to react at 35° C. under 7.5 MPa for 2 hours with stirring. As second reaction, a solvothermal reaction was performed at 150° C. under 18 MPa for 1 hour. Then, the resulting fluid mixture was cooled and supercritically dried to remove carbon dioxide and the solvent, to obtain magnesium carbonate nanoparticles.

The components and particle shapes of the products obtained in Examples 3-1 to 3-15 are summarized in Table 3.

TABLE 3

| Example No. | Metal salt | 1st reaction Temp. (° C.) | 1st reaction Pressure (MPa) | 2nd reaction Temp. (° C.) | 2nd reaction Pressure (MPa) | Time (h) | Particle shape | Product formula |
|---|---|---|---|---|---|---|---|---|
| 3-1 | $MgCl_2$ | — | — | 50 | 0.5 | 0.5 | sheet | $Mg(OH)_2$ |
| 3-2 | $MgCl_2$ | — | — | 50 | 0.5 | 0.5 | sheet | $Mg(OH)_2$ |
| 3-3 | $MgCl_2$ | — | — | 50 | 7 | 0.5 | sheet | $Mg(OH)_2$ |
| 3-4 | $MgCl_2$ | — | — | 80 | 7 | 0.5 | sheet | $Mg(OH)_2$ |
| 3-5 | $MgCl_2$ | — | — | 100 | 7 | 0.5 | sheet | $Mg(OH)_2$ |
| 3-6 | $MgCl_2$ | — | — | 120 | 7 | 0.5 | sheet | $Mg(OH)_2$ |
| 3-7 | $MgCl_2$ | 35 | 7.5 | 120 | 17 | 0.5 | sheet | $Mg(OH)_2$ |
| 3-8 | $MgCl_2$ | 50 | 7 | 130 | 16 | 0.5 | sheet | $Mg(OH)_2$ |
| 3-9 | $MgCl_2$ | 50 | 7 | 140 | 12 | 0.5 | sheet | $Mg(CO)_3$ |
| 3-10 | $MgCl_2$ | 50 | 7 | 150 | 11 | 0.5 | cube | $Mg(CO)_3$ |
| 3-11 | $MgCl_2$ | 50 | 7 | 180 | 12 | 0.5 | cube | $Mg(CO)_3$ |
| 3-12 | $MgCl_2$ | 50 | 7 | 190 | 12 | 0.5 | cube | $Mg(CO)_3$ |
| 3-13 | $MgCl_2$ | 50 | 7 | 200 | 14 | 0.5 | cube | $Mg(CO)_3$ |
| 3-14 | $MgCl_2$ | 50 | 7 | 210 | 13.5 | 1.5 | cube | $Mg(CO)_3$ |
| 3-15 | $Mg(NO_3)_2$ | 35 | 7.5 | 170 | 18 | 1 | sphere | $Mg(CO)_3$ |

It can be seen from the results of Examples 3-1 to 3-14 that the inventive method could produce nanoparticles of a metal hydroxide or an inorganic acid metal salt using a metal salt as a starting material. Particularly, it can be seen that sheet-shaped magnesium hydroxide nanoparticles were mainly produced when the second reaction temperature was 140° C. or less, whereas cubic-shaped magnesium carbonate nanoparticles were mainly produced when the second reaction temperature was 150° C. or higher.

Figure 7:
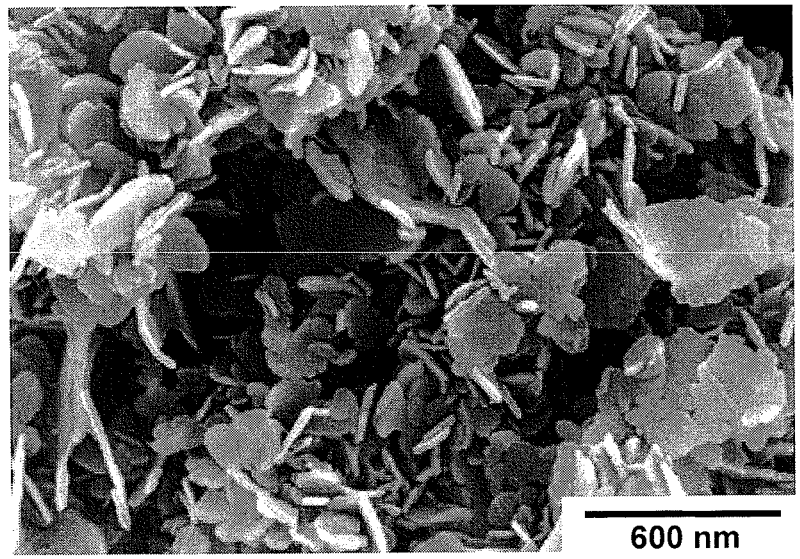
FIG. 7: an SEM image of the nanosheet-shaped magnesium hydroxide nanoparticles having a specific surface area of 80 $m^2/g$ obtained in Example 3-4.
Figure 8:
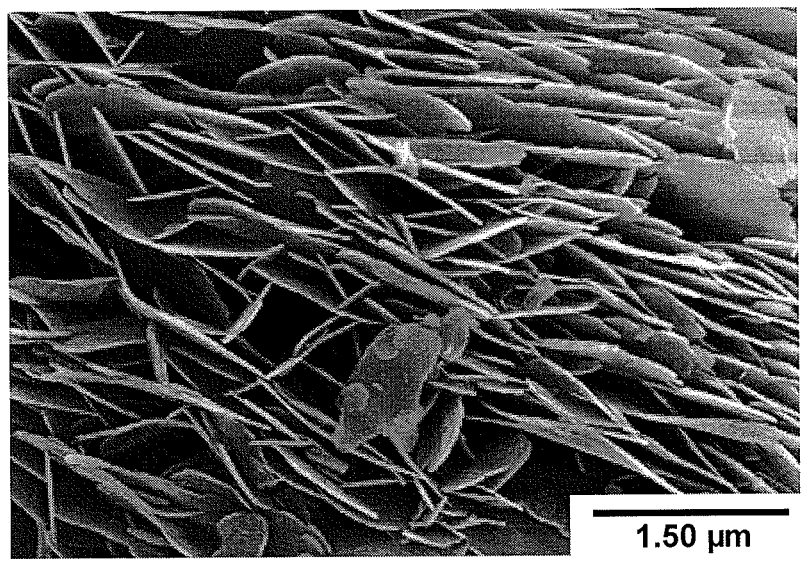
FIG. 8: an SEM image of the nanosheet-shaped magnesium carbonate nanoparticles obtained in Example 3-8.
Figure 9:
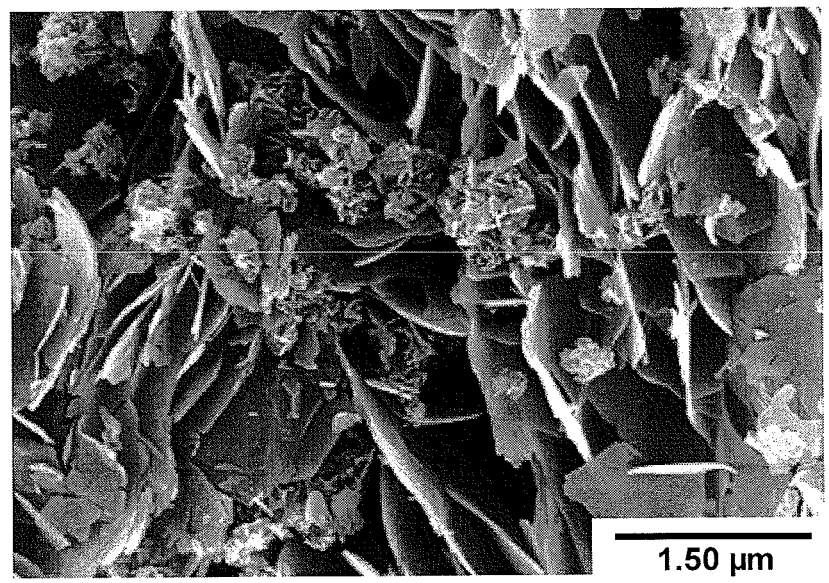
FIG. 9: an SEM image of the nanosheet-shaped magnesium carbonate nanoparticles obtained in Example 3-9.
Figure 10:
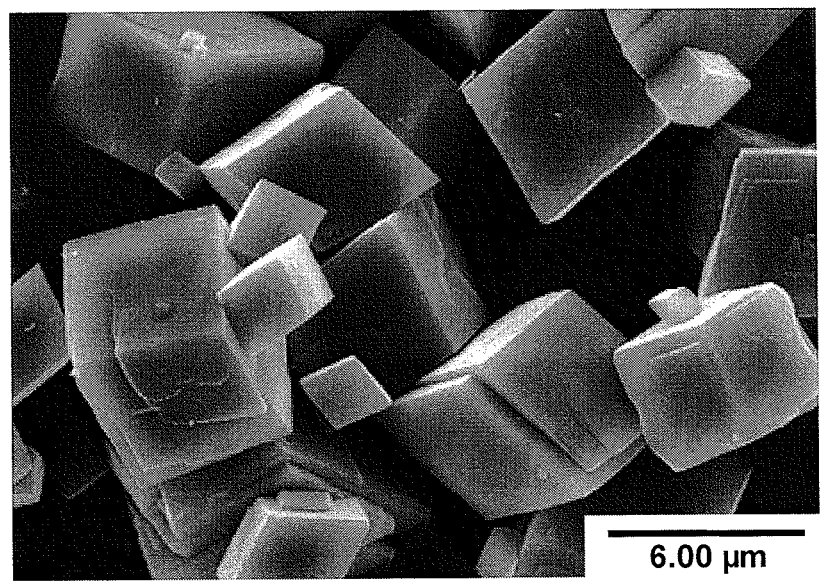
FIG. 10: an SEM image of the cubic magnesium carbonate nanoparticles obtained in Example 3-13.

FIGS. 7, 8 and 9 respectively show SEM images of the sheet-shaped nanoparticles of Examples 3-4, 3-8 and 3-9. It can be seen from FIGS. 7 to 9 that the sheet shape could be optimally formed at a temperature of 130 to 140° C.

Further, it can be seen from the results of Example 3-15 that the inventive method could prepare spherical magnesium carbonate nanoparticles from magnesium nitrate.

EXAMPLE 3-16

Figure 11:
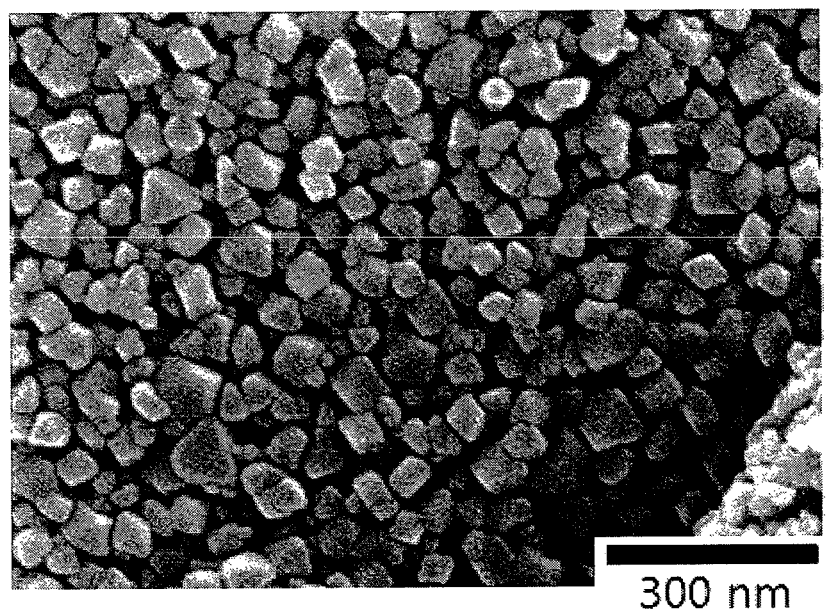
FIG. 11: an SEM image of the pyramidal magnesium oxide nanoparticles obtained in Example 3-16.

The nanoparticles obtained in Example 3-13 were further treated at 600° C., to obtain magnesium oxide nanoparticles having a pyramidal shape with a particle size of 50 nm. The SEM image of the nanoparticles is shown in FIG. 11.

COMPARATIVE EXAMPLE 1

Preparation of Cerium Oxide Particles

Cerium nitrate hexahydrate was added to ethanol to a concentration of 0.10 mol/L, stirred and dispersed to obtain a metal salt solution. Then, the metal salt solution was placed in an autoclave, heated to a reaction temperature of 125° C. and a pressure of 0.3 to 0.4 MPa, allowed to react for 90 min, cooled, and then dried in an oven at 80° C. for one day, so as to obtain cerium oxide particles.

Figure 12:
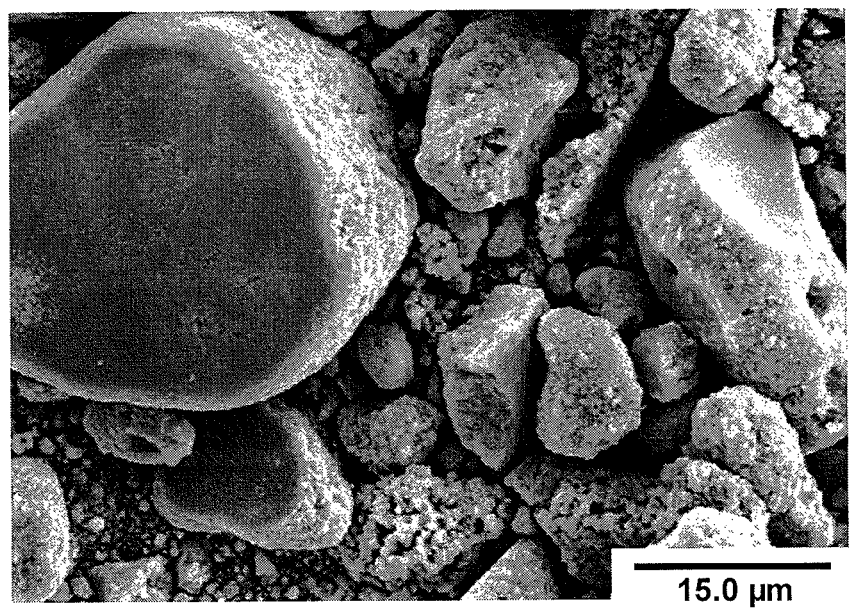
FIG. 12: an SEM image of the porous cerium oxide nanoparticles obtained in Comparative Example 1.

FIG. 12 shows an SEM image of the porous cerium oxide particles obtained in COMPARATIVE EXAMPLE 1. As shown in FIG. 12, the resulting particles have a large particle size and coarsely porous surface, and the particle shapes are not various.

COMPARATIVE EXAMPLE 2

Preparation of Gadolinium-Doped Cerium Oxide Particles

Cerium nitrate hexahydrate and gadolinium nitrate were added to ethanol to a concentration of 0.10 mol/L and 0.025 mol/L, respectively, stirred and dispersed to obtain a metal salt solution. The metal salt solution was placed in an autoclave, heated to a reaction temperature of 125° C. and a pressure of 0.3 to 0.4 MPa, allowed to react for 90 min, cooled, and then dried in an oven at 80° C. for one day, so as to obtain gadolinium-doped cerium oxide particles.

COMPARATIVE EXAMPLE 3

Preparation of Magnesium Oxide Particles

Magnesium chloride was added to ethanol to a concentration of 0.20 mol/L, stirred and dispersed to obtain a metal salt solution. The metal salt solution was placed in an autoclave, heated to a reaction temperature of 125° C. and a pressure of 0.3 to 0.4 MPa, allowed to react for 90 min, and cooled. As a result, magnesium oxide particles were not obtained.

Measurement of Specific Surface Area of Metal Compound Nanoparticles

The specific surface areas of the metal compound nanoparticles prepared in the above examples were measured as prepared or after conducting an additional heat-treatment process, which was conducted by heat-treating the each sample for 1 hour in the air. The results are summarized in Table 4.

TABLE 4

| Example No. | Phase | Reaction Temp. (° C.) | Heating Temp. (° C.) | BET ($m^2/g$) As-prepared | BET ($m^2/g$) Heat-treated | Particle shape |
|---|---|---|---|---|---|---|
| Comparative Ex. 1 | — | 125 | — | 19.5 | — | irregular sphere |
| Ex. 1-23 | $CeO_2$ | 125 | — | 24.0 | — | fiber |
| Ex. 1-24 | $CeO_2$ | 125 | — | 15.0 | — | fiber |
| Ex. 1-25 | $CeO_2$ | 125 | — | 14.2 | — | fiber |
| Ex. 1-24 | $CeO_2$ | 125 | 400 | — | 37.6 | fiber |
| Ex. 1-24 | $CeO_2$ | 125 | 500 | — | 42.5 | fiber |
| Ex. 1-25 | $CeO_2$ | 125 | 500 | — | 68.7 | fiber |
| Ex. 3-3 | MgO | 50 | 600 | 87.7 | 86.2 | sheet |
| Ex. 3-4 | MgO | 80 | 600 | 78.7 | 79.1 | sheet |
| Ex. 3-5 | MgO | 100 | 600 | — | 25.9 | sheet |
| Ex. 3-6 | MgO | 120 | 600 | — | 39.9 | sheet |
| Ex. 3-9 | MgO | 140 | 600 | 63.0 | 67.5 | sheet |
| Ex. 3-10 | MgO | 150 | 600 | — | 78.2 | cube |
| Ex. 3-11 | MgO | 180 | 600 | — | 90.3 | cube |
| Ex. 3-13 | MgO | 200 | 600 | — | 26.6 | cube |

As shown in Table 4, the specific surface area of the cerium oxide particles of Comparative Example 1 which is prepared by a hydrothermal method was 19.5 m²/g. On the other hand, the specific surface area of the nanofibers obtained in Example 1-23 was 24 m²/g and which obtained by heat-treating the nanofibers of Example 1-25 was 68.7 m²/g.

It can be seen from Table 4 that the metal oxide nanoparticles prepared by the inventive method have an improved specific surface area and that the inventive method can provide a superior specific surface area by conducting an additional heat-treatment process.

While the invention has been described with respect to the above specific embodiments, it should be recognized that various modifications and changes may be made to the invention by those skilled in the art which also fall within the scope of the invention as defined by the appended claims.

What is claimed is:

1. A method for preparing metal compound nanoparticles, comprising:
   adding a metal salt solution comprising at least one metal precursor in an organic solvent into a reactor, wherein the metal precursor comprises at least one chemical substance selected from the group consisting of a metal fluoride, a metal hydroxide, an inorganic acid metal salt, an organic acid metal salt, a metal hydride, and a metal complex, and wherein the metal of the metal precursor comprises one or more elements selected from the group consisting of Rh, Sb, Sc, Sr, V, Y, Ce, W, Fe, Zn, Cd, Mn, Ca, Ba, Cs, Cr, In, Se, Te, Ga, Gd, Ge, Dv, Pr, Sm, Ho, Lu, Tb, Eu, Nd, La, Hf, Er, and Yb;
   injecting $CO_2$ into the reactor to obtain a fluid mixture composed of the metal salt solution and the $CO_2$ compressed within the reactor;
   cooling the reaction mixture; and
   performing supercritical drying of the cooled reaction mixture to isolate the metal compound nanoparticles,
   wherein heating and pressuring the fluid mixture is performed at about 50° C. at about 7 MPa and maintaining the fluid mixture is performed at about 150° C. at about 11 MPa for about ½ hours.

2. The method of claim 1, wherein the organic solvent comprises at least one $C_1$-$C_{10}$ alcohol.

3. The method of claim 1, wherein at least two metal precursors are used in the metal salt solution to obtain doped metal compound nanoparticles or metal complex nanoparticles.

4. The method of claim 1, wherein the metal compound nanoparticles are shaped as spheres, fibers, sheets, wires, bundles, cubes, or pyramids.

5. The method of claim 1, further comprising subjecting the metal compound nanoparticles to a subsequent heat-treatment step.

6. The method of claim 1, wherein the metal salt solution further comprises an acid or an alkali.

7. The method of claim 1, wherein the metal of the metal precursor includes one or more components selected from the group consisting of Rh, Sb, Sc, Sr, V, Y, Ce, W, Fe, Zn, Cd, Mn, Ca, Ba, Cs, Cr, In, Se, Cd, Ga, Gd, Ge, Dy, Pr, Sm, Ho, Lu, Tb, Eu, Nd, La, Hf, Er, and Yb.

8. The method of claim 1, wherein the concentration of the metal precursor dispersed in the organic solvent is 0.01 mol/L to 5 mol/L.

9. The method of claim 1, wherein the organic solvent is methanol or ethanol.

10. The method of claim 9, wherein the organic solvent further comprises a secondary or tertiary alcohol in an amount of 0.01 mol to 10 mol based on 1 mol of the metal precursor.

11. The method of claim 1, wherein the metal salt solution further comprises an alkaline solution, an acidic solution, a reducing agent, an oxidizing agent, an aromatic hydrocarbon solvent or distilled in an amount of 0.01 mol to 10 mol based on 1 mol of the metal precursor.

12. The method of claim 1, wherein, before or during the solvothermal reaction, ammonia, nitrogen, methane, helium or argon gas is further added to the reaction mixture.

13. The method of claim 1, further comprising processing the nanoparticles into granules, balls, discs, cylinders, honeycombs, sheets or composite films, or into a ceramic, a metal, a polymer film, a substrate, or a support, to be used as a catalyst for fuel processing or a fuel cell, a desulfurization material, or an electrode for a fuel cell.

14. The method of claim 1, wherein the metal of the metal precursor comprises Cs.

15. The method of claim 1, wherein the metal compound nanoparticles are cube shaped.

* * * * *